Patented Oct. 23, 1951

2,572,086

UNITED STATES PATENT OFFICE 2,572,086

ROSIN ACID ESTERS

Harold Wittcoff and John Robert Roach, Minneapolis, Minn., assignors to General Mills, Inc., a corporation of Delaware No Drawing. Application May 8, 1947, Serial No. 746,854

4 Claims. (Cl. 260—26)

The present invention relates to novel rosin acid esters of highly functional polyhydric alcohols resulting from the condensation of a polyhydroxy compound and a polyfunctional alkylating agent.

It is an object of the present invention to provide rosin acid esters of high melting point and other superior properties resulting from the esterification of the above described polyhydric alcohols.

The polyhydric alcohols which are employed in the present invention are those described and claimed in our copending application entitled Polyhydric Alcohols, Serial No. 705,489, filed October 24, 1946, now U. S. Patent 2,537,726. These polyhydric alcohols result from the condensation of a polyhydroxy compound and a polyfunctional alkylating agent in which the molal ratio of polyfunctional alkylating agent varies from one-half to two moles per mole of polyhydroxy compound. The polyhydric alcohols employed for the formation of rosin acid esters are those which are obtained when the total number of groups of reactants capable of entering the alkylation reaction is at least 5. We believe that under these circumstances, a certain amount of cross-linking is obtained between the molecules of the polyhydroxy compound, and that this results in a different type of polyhydric alcohol. It will be apparent, therefore, that the polyhydric alcohols which are employed may be of considerable molecular weight and thus increase the size of the ester molecule considerably. For example, the product obtained by condensing glycerol and glycerol dichlorohydrin may have a molecular weight of around 800. It is thus possible to produce rosin ester molecules of appreciable size.

The rosin acid esters of the present invention are characterized by good color, extreme hardness, high melting point, and ability to yield varnishes with excellent properties when cooked with oils. They may be employed for the preparation of varnishes with oils ordinarily considered too "soft" for such a purpose. These include oils such as soybean, poppyseed, unboiled linseed, and the like, which, with ordinary rosin esters, do not produce the varnishes which dry rapidly to highly resistant films. Moreover, these rosin esters are quite heat stable and may be employed in varnish cooking at high temperatures without substantial decomposition or discoloration.

As was mentioned above, the polyhydric alcohols which are esterified in the present invention are those which result from the condensation of a polyhydroxy compound with a polyfunctional alkylating agent. The polyhydroxy compound may contain two or more hydroxyl groups and likewise the polyfunctional alkylating reagent may contain two or more alkylating groups. However for the purposes of the present invention, it is necessary that at least one of the compounds entering the alkylation reaction contain at least three reactive groups. Thus the polyhydroxy compound may contain three or more hydroxyl groups, such as is the case with glycerol, or it may contain two hydroxyl groups and an alkylating group such as is the case with glycerol monochlorohydrin. The alkylating reagent may contain a pair of alkylating groups and a hydroxyl group, an example of such a compound being glycerol dihalohydrin.

In preparing the polyhydric alcohol, considerable variation is possible in the polyhydroxy compound employed as well as in the polyfunctional alkylating agent. Suitable polyhydroxy compounds or derivatives thereof, include ethylene glycol, propylene glycol, butylene glycol, glycerol, diglycerol, triglycerol, higher polyglycerols, pentaerythritol, dipentaerythritol, higher polypentaerythritols, 2,2,6,6-tetramethylolcyclohexanol, 3,3,5,5 - tetramethylol - pyran - 4 - ol, 3,3,5 - trimethylol-5-methylpyran-4-ol, 3,5 - dimethylol - 3,5-dimethylpyran-4-ol, erythritol, xylitol, sorbitol, mannitol, sucrose, and the like. In addition, there may be employed such compounds as glycerol monochlorohydrin; glycerol dichlorohydrin; mono- or dichlorohydrins of diglycerol, triglycerol, tetraglycerol, etc., which may be prepared as disclosed in our copending application, Serial No. 705,435, entitled Halohydroxypropyl Ethers, filed on October 24, 1946; monoallylglycerol; monoallyldiglycerol which may be obtained as a by-product in the preparation of monoallylglycerol; monoallyldiglycerolmonochlorohydrin which may be obtained by the addition of one mole of hypochlorous acid to diallylglycerol; glycidol; glycerolglycidol; diglycerolglycidol; pentaerythritol mono- or dihalohydrin; and chloro- derivatives of 2,2,6,6-tetramethylolcyclohexanol or 2,2,6,6 - tetramethylolpyran - 4 - ol; epichlorohydrin; the diepoxide of diallyl ether; the diepoxide of diallylglycerol; and the like. It will be noted that there are included compounds such a glycerol dichlorohydrin which contains only one hydroxyl group. However, under the conditions of the alkylation reaction, once the alkylation process starts, some of the halogen atoms are replaced by hydroxyl groups, making the compound, in effect, a polyhydroxy compound. The term "polyhydroxy compound" used herein and in the claims is intended to include those compounds which possess free hydroxyl groups as well as those which possess potential hydroxyl groups which become available during the etherification process.

It to be noted that the polyhydroxy compounds used in the alkylation reaction herein disclosed, are of relatively low molecular weight as compared with higher polymeric polyhydroxy compounds, such as starch, cellulose, and the like, which would not be suitable for the instant purpose as they form products which are insoluble, etc.

Suitable polyfunctional alkylating reagents include glycerol dihalohydrins (chloro, bromo, iodo), epihalohydrin, diglyceroldihalohydrin, triglyceroldihalohydrin, the diepoxide of diallyl ether, the diepoxide of diallylglycerol, tetraglyceroldihalohydrin, and similar reagents which serve not only to introduce cross-linking, but which at the same time, introduce additional hydroxyl groups into the molecule, thus serving the very valuable purpose of increasing the hydroxyl functionality. Many of these alkylating agents may be made in accordance with the teachings of the above referred to halohydroxypropyl ethers case. Thus diglyceroldihalohydrin may be made by a hypohalous acid addition to diallyl ether; triglyceroldihalohydrin by the hypohalous acid addition to diallylglycerol; the diepoxide of diallyl ether and the diepoxide of diallylglycerol by treatment of the corresponding halohydrin with strong alkali; tetraglyceroltrihalohydrin by the hypohalous acid addition to triallylglycerol. Still other compounds which have been found valuable as polyfunctional alkylating reagents include 1,4-dichlorobutene-2, 1,2-dichlorobutene-3, any of the dichloropropylenes, and similar compounds. These reagents introduce not only cross-linking, but also carbon-to-carbon unsaturation which imparts valuable properties to the polyhydric alcohol, especially if it is to be converted to derivatives which are to be polymerized. Still other reagents which have been found valuable as di- or higher polyfunctional alkylating reagents include 2-chloroethyl ether, ethylene dichloride, ethylene dibromide, 1,2,3-trichloropropane, the bis-(chloromethyl) - benzenes, 2,4 - dichloronitrobenzene, and in fact any compound containing two or more halogen atoms which are fairly reactive.

The rosin acids used in the new compositions may be any of those ordinarily employed in ester gum formation, such as gum or wood rosin, pure oleorosin, sapinic acids, pimaric acids, abietic acids, and the like, and in general any of the products which are generally termed "gum colophony." In addition, there may be used polymerized, disproportionated, or hydrogenated rosin, or the rosin fractions of tall oil, all of which materials are contemplated within the term "rosin acid."

Various modifications of the straight esterification likewise come within the scope of the invention. Thus compositions may be prepared in which the acids are mixtures of rosin acids and unsaturated fatty acids such as those from linseed or soybean or any drying or semi-drying oil. These compositions vary in physical state from a plastic composition to a hard solid, depending on the amount of fatty acids used. These compositions are readily cooked into excellent varnishes when combined with drying oils or with semi-drying oils such as soybean oil which are ordinarily considered too "soft" for varnish preparation. Instead of the higher unsaturated fatty acids such as those from vegetable oils, there may likewise be used lower aliphatic unsaturated acids such as crotonic, acrylic, and the like, or acids such as furoic which contain unsaturated heterocyclic nuclei.

Likewise a polybasic acid or anhydride may be included, such as phthalic, maleic, or any of the polybasic acids ordinarily employed in the preparation of alkyd resins. By this means a much harder and even higher melting product is obtained than where a dibasic acid is not used as will be seen from one of the examples employing a rosin acid ester modified with maleic acid. In these compositions, acids or anhydrides which contain alpha,beta-unsaturation are preferred.

The rosin esters so obtained my be combined with waxes such as paraffin wax, carnauba, candelilla, and a variety of natural or synthetic waxes to obtain compositions which are harder and higher melting than the original waxes.

The procedure for the esterification may follow any of those ordinarily employed for rosin acid esterification. The rosin is generally melted and the polyhydroxy material may be added all at once or gradually over several hours. Stirring and an inert atmosphere are advisable, and temperatures as high as 300° C. may be employed for periods of time ranging from two to eighteen hours. However, a period of time varying from six to eight hours is usually sufficient to obtain a low acid number. The water of reaction may be removed azeotropically or by bubbling an inert gas through the reaction mixture. The application of a vacuum, especially at the end of the reaction, is likewise advisable. In addition, catalysts such as metallic stearates, acidic catalysts such as zinc chloride, mineral acids, or p-toluene sulfonic acid, and the like, facilitate the reaction.

*Example 1*

Pentaerythritol (272 parts) was mixed with aqueous sodium hydroxide (50%, 704 parts) after which the mixture was heated at 90° C. for thirty minutes. Glycerol dichlorohydrin (516 parts) was added with stirring over a period of four and one-half hours at a temperature which did not exceed 105° C. Thereafter, the reaction mixture was heated and stirred for one-half hour longer, after which the reaction mixture was diluted with methanol, neutralized with dilute hydrochloric acid and filtered. The filtrate was desolvated under reduced pressure and a product was obtained by methanol extraction. The resulting syrup had a hydroxyl content of 29.0%.

Grade WW gum rosin (300 parts) was melted with zinc stearate (2.2 parts) and xylene was added to remove azeotropically the water of esterification. The mixture was heated with stirring to 270° C. and the above condensation product (52 parts in 35 parts of water) was added over a period of three hours. During this time the temperature rose to 265° C. and was maintained there for a total reaction time of eleven hours. The light-colored product had an acid number of 20 and a capillary melting point of 115° C.

*Example 2*

Glycerol (95%, 485 parts) was mixed with aqueous sodium hydroxide (50%, 880 parts) and the mixture externally cooled. The mixture was then heated to 90° C. and glycerol dichlorohydrin (645 parts) was added with stirring over a period of four and one-half hours. The reaction was continued at 90°-95° C. with stirring for a total reaction time of seven hours, after which the reaction mixture was neutralized with hydrochloric acid, diluted with methanol, and filtered. The filtrate was evaporated under reduced pressure to yield a mixture of product and inorganic material, from which the product was extracted with methanol. The solvent was removed under reduced pressure, after which excess glycerol was removed by distillation under reduced pressure to yield a syrup with a hydroxyl content of 27.4%.

Grade WW gum rosin (277.2 parts) was melted with zinc stearate (2.2 parts) and xylene was added to remove azeotropically the water of reaction. The mixture was heated with stirring to 270° C. and the above condensation product (52 parts in 30 parts of water) was added over a period of four and one-half hours, during which time the temperature was raised to 265–270° C. The reaction was continued for a total of twelve hours. The light-colored product had an acid number of 16 and a capillary melting point of 98° C.

*Example 3*

Glycerol (95%, 679 parts) and sodium hydroxide (50%, 1200 parts) were mixed and heated to 90° C. To the stirred mixture was added over a period of five hours 903 parts of glycerol dichlorohydrin, after which the reaction was allowed to continue for two hours longer. The cooled mixture was diluted with methanol, neutralized with concentrated hydrochloric acid, and filtered. Evaporation of the solvent yielded a mixture of product and salt from which the product was extracted with methanol. There was obtained a syrup with a hydroxyl content of 28.8%.

A mixture of WW grade gum rosin (250 parts), maleic anhydride (24.5 parts) and zinc stearate (2.2 parts) was heated and stirred for one-half hour at 165–235° C. Xylene was present to remove the water of reaction azeotropically. The temperature was then raised to 260° C. and the above condensation product (73 parts in 18 parts of water) was added over a period of three and one-half hours. The reaction was continued for two hours longer to obtain a light-colored product with a low acid number and a ball and ring melting point of 144° C.

While various modifications of the invention have been described, it is to be understood that the same is not limited thereto, but may be varied within the scope of the following claims.

We claim as our invention:

1. A rosin acid ester of a non-distillable crosslinked polymeric polyhydric alcohol, said polyhydric alcohol resulting from the substantially complete condensation under alkaline conditions of glycerol dichlorhydrin with a polyhydroxy compound selected from the group consisting of pentaerythritol and glycerol, the glycerol dichlorhydrin being employed in the relative proportion of not substantially in excess of two moles per mole of the polyhydroxy compound, and not substantially less than about one-half mole per mole of the polyhydroxy compound, said polyhydric alcohol being substantially completely esterified.

2. A rosin acid ester according to claim 1 in which the polyhydric alcohol is also partially esterified with a polybasic carboxylic organic acid.

3. A rosin acid ester according to claim 1 in which the polyhydric alcohol is also partially esterified with maleic acid.

4. A rosin acid ester of a non-distillable crosslinked polymeric polyhydric alcohol, said polyhydric alcohol resulting from the substantially complete condensation under alkaline conditions of glycerol dichlorhydrin and glycerol, the glycerol dichlorhydrin being employed in the relative proportion of not substantially in excess of two mols per mol of glycerol and not substantially less than about one-half mol per mol of glycerol, said polyhydric alcohol being substantially completely esterified.

HAROLD WITTCOFF.
JOHN ROBERT ROACH.

REFERENCES CITED

The following references are of record in the file of this patent:

UNITED STATES PATENTS

| Number | Name | Date |
|---|---|---|
| 1,696,337 | Symmes | Dec. 25, 1928 |
| 1,922,459 | Schmidt et al. | Aug. 15, 1933 |
| 2,340,043 | Clare | Jan. 25, 1944 |
| 2,409,332 | Woodruff | Oct. 15, 1946 |